US010170238B2

(12) United States Patent
Rejman et al.

(10) Patent No.: US 10,170,238 B2
(45) Date of Patent: Jan. 1, 2019

(54) HAND TOOL DEVICE HAVING AT LEAST ONE CHARGING COIL

(75) Inventors: Marcin Rejman, Waiblingen (DE); Guenter Lohr, Leinfelden-Echterdingen (DE); Juergen Mack, Goeppingen (DE); Friederike Dietzel, Stuttgart (DE); Volker Amann, Balingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 293 days.

(21) Appl. No.: 13/609,878

(22) Filed: Sep. 11, 2012

(65) Prior Publication Data

US 2013/0069595 A1 Mar. 21, 2013

(30) Foreign Application Priority Data

Sep. 20, 2011 (DE) .................. 10 2011 083 006
Jul. 27, 2012 (DE) .................. 10 2012 213 263

(51) Int. Cl.

| H01F 27/30 | (2006.01) |
|---|---|
| H01F 27/26 | (2006.01) |
| H02J 7/02 | (2016.01) |
| H01F 38/14 | (2006.01) |
| H02J 50/10 | (2016.01) |
| H02J 50/40 | (2016.01) |
| H01F 27/245 | (2006.01) |
| H02J 5/00 | (2016.01) |

(52) U.S. Cl.
CPC .......... *H01F 38/14* (2013.01); *H01F 27/245* (2013.01); *H01F 27/26* (2013.01); *H01F 27/263* (2013.01); *H01F 27/30* (2013.01); *H01F 27/306* (2013.01); *H02J 5/005* (2013.01); *H02J 7/025* (2013.01); *H02J 50/10* (2016.02); *H02J 50/40* (2016.02)

(58) Field of Classification Search
CPC .......... H02J 7/025; H02J 5/005; H01F 38/14
USPC .... 320/108, 114; 336/15, 90, 117, 177, 212, 336/219, 229, 233, 234; 307/104, 10.1
See application file for complete search history.

(56) References Cited

U.S. PATENT DOCUMENTS

| 1,606,777 | A | * | 11/1926 | Payne | .............................. | 336/83 |
|---|---|---|---|---|---|---|
| 2,637,836 | A | * | 5/1953 | Thomas et al. | ............... | 320/150 |
| 3,753,058 | A | * | 8/1973 | Edson | ........................... | 318/118 |
| 3,798,059 | A | * | 3/1974 | Astle et al. | .................... | 336/229 |
| 3,843,968 | A | * | 10/1974 | Kroon | .......................... | 360/121 |
| 3,863,268 | A | * | 1/1975 | Ikeda | ........................... | 360/121 |
| 3,909,932 | A | * | 10/1975 | Kroon | ....................... | 29/603.21 |

(Continued)

FOREIGN PATENT DOCUMENTS

| CN | 101630562 A | 1/2010 |
|---|---|---|
| CN | 101971453 A | 2/2011 |

(Continued)

OTHER PUBLICATIONS

"Electric Power Systems," S.A. Nasar and F.C. Trutt, Department of Engineering University of Kentucky, CRC Press, Published 1998/1999, p. 222.*

*Primary Examiner* — Robert Grant
*Assistant Examiner* — John Trischler
(74) *Attorney, Agent, or Firm* — Norton Rose Fulbright US LLP; Gerard Messina (57) ABSTRACT

A hand tool device having at least one charging coil, which includes at least one coil core which is at least partially made of a ceramic material and which is provided for transmitting energy. The coil core may be configured as a composite component.

13 Claims, 4 Drawing Sheets

(56) References Cited

U.S. PATENT DOCUMENTS

| | | | | |
|---|---|---|---|---|
| 4,061,956 A * | 12/1977 | Brown et al. | | 320/153 |
| 4,103,267 A * | 7/1978 | Olschewski | | H01F 27/2804 29/606 |
| 4,152,741 A * | 5/1979 | Mizuno et al. | | 360/119.11 |
| 4,511,872 A * | 4/1985 | Olmsted | | H01F 21/06 264/611 |
| 4,523,170 A * | 6/1985 | Huth, III | | H01F 21/06 264/611 |
| 4,543,208 A * | 9/1985 | Horie | | B22F 1/0059 148/104 |
| 4,649,639 A * | 3/1987 | Mas | | H01F 27/25 29/605 |
| 4,662,226 A * | 5/1987 | Wang | | G01L 9/007 29/454 |
| 4,689,593 A * | 8/1987 | Richardson | | H01F 27/2804 333/24 R |
| 4,712,055 A * | 12/1987 | Houser, Jr. | | 320/144 |
| 5,072,205 A * | 12/1991 | Arakawa | | H01F 1/15383 336/213 |
| 5,083,366 A * | 1/1992 | Arakawa | | H01F 1/15383 29/605 |
| 5,136,231 A * | 8/1992 | Faulk | | 320/134 |
| 5,191,699 A * | 3/1993 | Ganslmeier et al. | | 29/602.1 |
| 5,349,743 A * | 9/1994 | Grader | | H01F 17/0033 156/89.12 |
| 5,430,613 A * | 7/1995 | Hastings | | H01F 1/0027 29/606 |
| 5,483,143 A * | 1/1996 | Hall et al. | | 320/108 |
| 5,656,983 A * | 8/1997 | Ito et al. | | 335/297 |
| 5,719,546 A * | 2/1998 | Ito | | H01F 38/14 336/173 |
| 5,748,013 A * | 5/1998 | Beauclair et al. | | 336/233 |
| 6,049,191 A * | 4/2000 | Terazoe et al. | | 320/108 |
| 6,275,006 B1 | 8/2001 | Koike et al. | | 320/125 |
| 6,288,870 B1 * | 9/2001 | Saliba | | 360/121 |
| 6,495,992 B1 | 12/2002 | Pavlovic | | 320/161 |
| 6,596,200 B1 | 7/2003 | Ogawa et al. | | 252/512 |
| 6,850,040 B2 | 2/2005 | Xiong et al. | | 320/134 |
| 6,879,237 B1 * | 4/2005 | Viarouge et al. | | 336/229 |
| 6,888,435 B2 * | 5/2005 | Inoue et al. | | 336/83 |
| 6,917,182 B2 * | 7/2005 | Burton et al. | | 320/108 |
| 7,378,036 B2 * | 5/2008 | Wada | | C04B 35/265 252/62.59 |
| 7,501,925 B2 * | 3/2009 | Naito | | C22C 33/0207 148/304 |
| 8,005,547 B2 * | 8/2011 | Forsberg | | A61N 1/3787 607/33 |
| 8,165,678 B2 * | 4/2012 | Forsberg | | A61N 1/3787 607/33 |
| 8,283,888 B2 * | 10/2012 | Inoue et al. | | 320/108 |
| 8,427,011 B2 * | 4/2013 | Jung et al. | | 307/104 |
| 8,436,492 B2 * | 5/2013 | Jung et al. | | 307/104 |
| 8,552,593 B2 * | 10/2013 | Jung et al. | | 307/104 |
| 8,624,546 B2 * | 1/2014 | Jung et al. | | 320/108 |
| 8,643,342 B2 * | 2/2014 | Mehta et al. | | 320/160 |
| 8,754,614 B2 * | 6/2014 | Paryani et al. | | 320/162 |
| 8,760,010 B2 * | 6/2014 | Jung et al. | | 307/104 |
| 2003/0085684 A1 * | 5/2003 | Tsukamoto et al. | | 320/108 |
| 2005/0017677 A1 * | 1/2005 | Burton et al. | | 320/108 |
| 2005/0052783 A1 * | 3/2005 | Suda | | 360/121 |
| 2005/0152720 A1 * | 7/2005 | Katakabe | | G03G 15/2053 399/330 |
| 2005/0153821 A1 * | 7/2005 | Grinberg | | F16C 13/00 492/44 |
| 2005/0183514 A1 * | 8/2005 | Huybrechts et al. | | 73/861.12 |
| 2006/0028176 A1 * | 2/2006 | Tang et al. | | 320/114 |
| 2006/0125586 A1 * | 6/2006 | Lee et al. | | 336/83 |
| 2007/0126546 A1 * | 6/2007 | Guenther | | C22C 38/002 336/229 |
| 2008/0074084 A1 * | 3/2008 | Lee et al. | | 320/150 |
| 2008/0197711 A1 * | 8/2008 | Kato et al. | | 307/104 |
| 2008/0211455 A1 * | 9/2008 | Park et al. | | 320/108 |
| 2009/0079386 A1 * | 3/2009 | Gallagher et al. | | 320/108 |
| 2009/0201113 A1 * | 8/2009 | Crawford et al. | | 336/15 |
| 2009/0206975 A1 * | 8/2009 | Nuetzel | | B22F 3/02 336/233 |
| 2010/0007215 A1 * | 1/2010 | Sakuma | | H01F 38/14 307/104 |
| 2010/0076524 A1 * | 3/2010 | Forsberg | | A61N 1/3787 607/61 |
| 2010/0127666 A1 * | 5/2010 | Ball | | 320/152 |
| 2011/0084652 A1 * | 4/2011 | Julstrom et al. | | 320/108 |
| 2011/0121935 A1 * | 5/2011 | Chu et al. | | 336/221 |
| 2011/0140538 A1 * | 6/2011 | Jung et al. | | 307/104 |
| 2011/0298420 A1 * | 12/2011 | Forsberg | | A61N 1/3787 320/108 |
| 2011/0316475 A1 * | 12/2011 | Jung et al. | | 320/108 |
| 2012/0146576 A1 * | 6/2012 | Partovi | | 320/108 |
| 2013/0008179 A1 * | 1/2013 | Mitchell et al. | | 60/796 |
| 2013/0020862 A1 * | 1/2013 | Miller | | 307/9.1 |
| 2013/0069595 A1 * | 3/2013 | Rejman et al. | | 320/114 |
| 2013/0257359 A1 * | 10/2013 | Sakai et al. | | 320/107 |
| 2013/0285605 A1 * | 10/2013 | Partovi | | 320/108 |
| 2013/0341758 A1 * | 12/2013 | Lee et al. | | 257/531 |
| 2014/0092243 A1 * | 4/2014 | Ichikawa | | 348/143 |
| 2014/0097671 A1 * | 4/2014 | Nakamura et al. | | 307/9.1 |
| 2014/0104288 A1 * | 4/2014 | Shenoy et al. | | 345/531 |

FOREIGN PATENT DOCUMENTS

| | | |
|---|---|---|
| DE | 2606801 B1 | 6/1977 |
| DE | 19709651 A1 | 10/1997 |
| DE | 102006042603 A1 | 3/2008 |
| DE | 102008054904 A1 | 6/2010 |
| JP | 06163273 A * | 6/1994 |

* cited by examiner

HAND TOOL DEVICE HAVING AT LEAST ONE CHARGING COIL

RELATED APPLICATION INFORMATION

The present application claims priority to and the benefit of German patent application no. 10 2011 083 006.5, which was filed in Germany on Sep. 20, 2011, and of German patent application no. 10 2012 213 263.5, which was filed in Germany on Jul. 27, 2012, the disclosures of which are incorporated herein by reference.

FIELD OF THE INVENTION

The present invention relates to a hand tool device having at least one charging coil.

BACKGROUND INFORMATION

It is understood that a hand tool device may have been proposed which has at least one charging coil, which includes a coil core, which is at least partially made of a ceramic material.

SUMMARY OF THE INVENTION

The exemplary embodiment and/or exemplary method of the present invention are directed to a hand tool device having at least one charging coil, which includes a coil core which is at least partially made of a ceramic material and which is provided for transmitting energy.

The coil core is configured as a composite component. A "charging coil" is understood to be, in particular, a coil having at least one wound, in particular coiled, electrical conductor, which is provided for transmitting and/or for receiving energy for charging and/or discharging, in particular a hand tool battery in at least one operating state. In particular, the charging coil is provided for supplying received energy directly to a consumer, in particular via a voltage transformer. The charging coil may be provided for converting an electric alternating current into a magnetic alternating field and/or vice versa. A system having a hand tool battery and a charging unit and/or a hand tool includes at least two coordinated charging coils, which are spatially separable by a user, of which at least one charging coil is provided in at least one operating state for generating a magnetic alternating field which induces an electric alternating current in at least one other charging coil. In particular, the charging coil is provided for receiving and transmitting energy from a power network and/or a comparable power source or a generator, in particular with the aid of voltage transformer electronics, a frequency between 30 Hz and 60 Hz and/or a voltage between 100 V and 300 V being used, in particular. Alternatively, a charging coil is supplied with energy via voltage transformer electronics having direct current, for example from a vehicle electrical system. A "coil core" is understood to be, in particular, a component which is provided for bundling a magnetic field which is generated, in particular by the wound electrical conductor of the charging coil and may be for conducting magnetic field lines to another charging coil.

The coil core advantageously has at least one magnetic field bundling element which together form(s) at least 40%, advantageously at least 60%, particularly advantageously at least 80%, which may be at least 90% of the volume of the coil core. A "magnetic field bundling element" is understood to be, in particular, an element which is made of a what may be a ferrimagnetic, in particular soft magnetic, material. Alternatively, ferromagnetic and/or antiferromagnetic materials may be used. The at least one "magnetic field bundling element" advantageously has a relative permeability greater than 100, which may be greater than 1,000, particularly may be greater than 5,000. In particular, the coil core is situated at least partially in an interior of the charging coil. An "interior" of the charging coil is understood to be, in particular, a quantity of points, each of which is intersected by at least one connecting line between two points, each of which is located on the wound electrical conductor of the charging coil. "Provided" is understood to mean, in particular, specially configured and/or equipped. The term "transmitted" in this context is understood to mean, in particular, the fact that the charging coil is provided for transferring energy with the aid of a magnetic field.

The charging coil may be provided for transmitting the energy through an electrically insulating layer. The electrically insulating layer may be an area of a housing at least of the hand tool device. A "composite component" is understood to be, in particular, a component which is formed from at least two, in particular any number of, parts of at least two materials which are at least integrally connected to each other. In particular, the parts each have an extension of at least 100 nm, in particular at least 1 µm, advantageously at least 10 µm, which may be at least 100 µm in at least one spatial direction. In particular, the composite component forms a module which is mountable on the charging coil separately from the wound electrical conductor. The composite component may differ from a component produced by an integral fitting process which connects the electrical conductor to the coil core. Due to the configuration according to the present invention, a higher resistance to breaking and/or dimensional stability may be achieved.

In particular, the coil core is provided to at least largely retain its original shape if it is broken. "Largely retain its original shape" is understood to mean, in particular, that at least 50%, in particular at least 70%, advantageously at least 80%, which may be at least 95% of the volume of the coil core deviates by less than 5 mm, advantageously less than 2 mm from an original position after the coil core breaks.

It is advantageously proposed that the coil core has at least one magnetic field bundling element which is made of a ceramic material. In particular, the at least one magnetic field bundling element is made of a ferrite. A "ceramic material" is understood to be, in particular, a nonmetallic, anorganic and polycrystalline material which is produced, in particular, by a firing process, which may be a sintering process, a raw material may be provided in a fine-grained form, in particular as a powder. A "ferrite" is understood to be, in particular, a ferromagnetic, ceramic material which is made at least largely, in particular at least 70%, advantageously at least 80%, which may be at least 90% of iron oxide ($Fe_2O_3$ and/or $Fe_3O_4$), which may be in a sintering process. In particular, the ferrite includes nickel, zinc and/or manganese compounds. In particular, an effective bundling may be achieved with simultaneously very few losses.

Alternatively, the coil core may also be made of metallic, which may be ferromagnetic, particles, in particular pellets, which are at least partially surrounded by ceramic material and embedded, in particular, into a ceramic matrix.

It may furthermore be provided that the coil core be configured in a largely toroid shape. The fact that an object is "in a largely toroid shape" is understood to mean, in particular, that at least one toroid exists which is located completely within the object, at least 50%, in particular at least 70%, advantageously at least 90%, which may be at least 95% of the points of the object being part of the toroid. A "toroid" is understood to be, in particular, an object whose points are passed over by a cross-sectional surface when the cross-sectional surface rotates around a rotation axis which may be located outside the cross-sectional surface, the cross-sectional surface and the rotation axis being located on a plane.

A "cross-sectional surface" is understood to be, in particular, a two-dimensional object delimited by at least one closed line. Toroid designs are furthermore conceivable in which the cross-sectional surface is run along what may be a regular polygon. Alternatively, the coil core may be configured as a circular disk and/or advantageously as an annular disk. Alternatively, designs in the form of a disk having a different shape which seems meaningful to those skilled in the art are also conceivable, advantageously, however, those having a rectangular, which may be square, basic shape. In particular, a shape of the coil core is dependent on a shape of the charging coil. In particular, a material-conserving and/or effective coil core may be provided.

The coil core may have at least one magnetic field bundling element which is provided with a largely toroid design. In particular, a material-conserving and/or effective coil core may be provided.

The coil core may be made at least partially of a film. A "film" is understood to be, in particular, a planar, which may be a flexible, material which has an extension that is greater than at least ten times, in particular one hundred times, which may be one thousand times the thickness of a film in a spread-out state in two spatial directions. In particular, a thickness of the film is a maximum of 3 mm, advantageously a maximum of 1 mm, which may be a maximum of 0.3 mm. In particular, the film is at least partially made of fiber material, in particular natural fibers, mineral fibers, glass fibers and/or carbon fibers. In particular, the fiber material is used to increase the tear strength of the film. In particular, the film is configured as a fabric. The film may be connected directly to the at least one magnetic field bundling element, in particular welded and/or glued. In particular, the film is provided on parts of the coil core by spraying. In particular, a dimensional stability of the coil core may be achieved in the event of breakage, for example if the hand tool device is dropped, by maintaining resulting fragments in position by a form-locked connection to the film, whereby the magnetic field bundling properties of the coil core, in particular, are at least largely retained.

Furthermore, the film may form at least one part of a surface of the coil core. A "surface" of the coil core is understood to be, in particular, a totality of all surfaces of the coil core which are freely accessible in a removed state and/or in a state prior to installation of the coil core. The film may be situated on at least one side of the coil core which is located parallel to a main coil plane of the charging coil, at least in the mounted position. A "main coil plane" of a coil is understood to be, in particular, a plane which is intersected perpendicularly by at least 50%, in particular at least 70%, which may be at least 90% of the magnetic field lines which are generated by the wound electrical conductor of the coil, in an operating state of the coil, in particular in a state without any influence by a magnetic field bundling element. An economical configuration of the exemplary embodiment and/or exemplary method of the present invention may be achieved, in particular. Alternatively, designs are conceivable in which the film is situated between parts, in particular between magnetic field bundling elements, whereby an increased stability and/or an improved dimensional and thus functional stability, in particular, may be achieved.

It is furthermore proposed that the coil core be at least partially made of a soft elastic material. A "soft elastic" material is understood to be, in particular, a material having an elasticity modulus of less than 5 kN/mm$^2$, in particular less than 2 kN/mm$^2$, advantageously less than 0.5 kN/mm$^2$, which may be less than 0.1 kN/mm$^2$. In particular, the soft elastic material is a polymer, in particular a plastic, for example PVC, PVB, PP, PE, PA, and/or rubber. In particular, at least the film is made at least partially of the soft elastic material. Alternatively, designs are conceivable in which a large number of magnetic field bundling elements are at least partially surrounded by soft elastic material, in particular in powder form, which may have a particle diameter of less than 100 μm, and/or in the form of pellets, and are embedded, in particular, into a matrix of soft elastic material. In particular, it is possible to achieve the fact that at least part of the coil core is protected against breaking, whereby a dimensional and thus functional stability may be increased.

A hand tool battery, a charging device and a hand tool having at least one hand tool device according to the present invention are furthermore proposed. Systems of a hand tool battery, a charging device and/or a hand tool are also proposed.

In particular, the hand tool battery is provided for inductively receiving electrical energy from a charging device in a charging state and supplying electrical energy, in particular inductively, to a hand tool in an operating state. In particular, the hand tool battery is configured as a module which is separate from the hand tool. Alternatively, it is conceivable for the hand tool battery to be integrated into the hand tool, an energy storage unit, in particular, which may lose its storage capacity due to aging phenomena, being kept ready for replacement. The use of inductive energy transmission makes it possible, in particular, to eliminate metallic contact points, which are frequently subjected to mechanical load and which may corrode and lose their electrical properties. In particular, the hand tool device, in particular of the hand tool battery, has an electronic system which is provided for the purpose of converting an alternating current induced in the charging coil of the hand tool device into a direct current storable in an energy storage unit, and/or for the purpose of converting a direct current received from the energy storage unit into an alternating current for supplying the charging coil therewith and for transmitting energy to a corresponding charging coil.

Further advantages are derived from the following description of the drawings. An exemplary embodiment of the present invention is illustrated in the drawings. The drawings, description and claims include combinations of numerous features. Those skilled in the art will also advantageously view the features individually and combine them in additional meaningful configurations.

DETAILED DESCRIPTION

Figure 1:
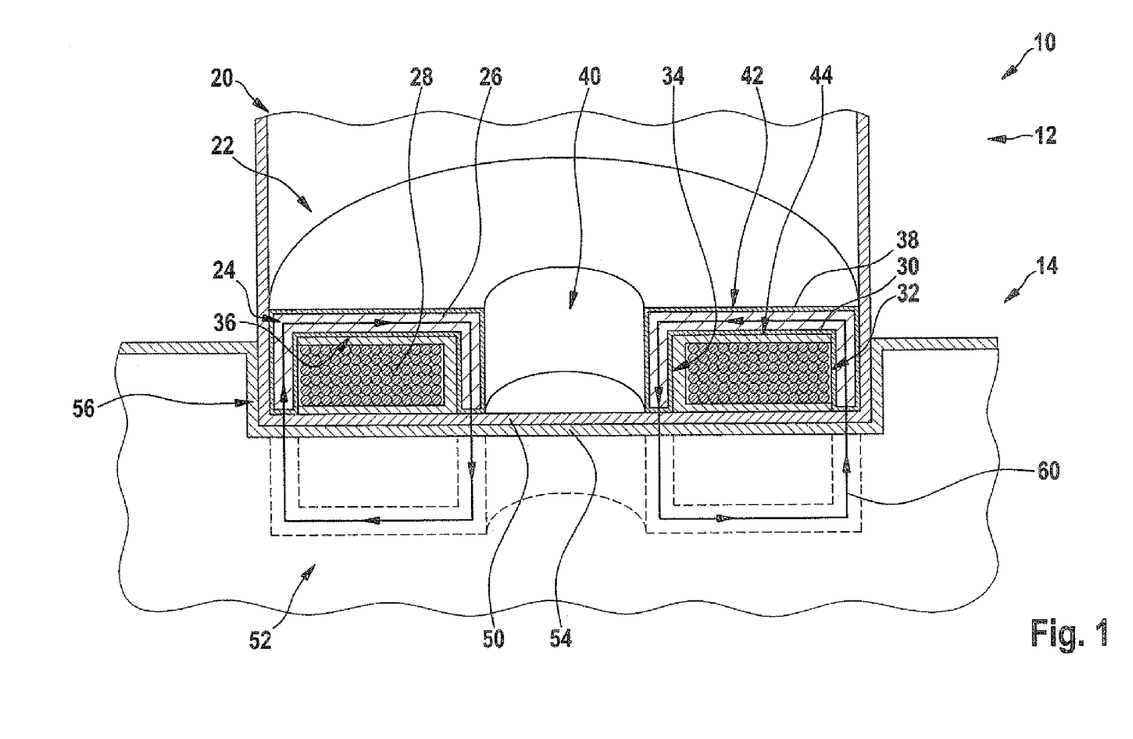
FIG. 1 shows a system of the present invention having a hand tool battery and a charging unit.

FIG. 1 shows a system 10 having a hand tool battery 12 and a charging unit 14. Hand tool battery 12 has a hand tool device 20. Hand tool device 20 has a charging coil 22, which includes a coil core 24, which is partially made of a ceramic material. Charging coil 22 also has a wound electrical conductor 28. Charging coil 22 furthermore has a coil carrier 30. Wound electrical conductor 28 is formed from an insulated wire, a litz conductor or a high frequency litz wire. Wound electrical conductor 28 is coiled onto coil carrier 30. Charging coil 22 is provided for transmitting energy. Coil core 24 is configured as a composite component. Coil core 24 has a magnetic field bundling element 26 which is made of a ceramic material. Magnetic field bundling element 26 is made of ferrite.

Magnetic field bundling element 26 is manufactured as a single piece in a compression molding and sintering process. Coil core 24 has a toroid design. Magnetic field bundling element 26 has a toroid design. Magnetic field bundling element 26 has a U-shaped cross-sectional surface. Magnetic field bundling element 26 has a material thickness of 3 mm. Charging coil 22 has a diameter of 66 mm. Magnetic field bundling element 26 surrounds wound electrical conductor 28 on an outer side 32, on an inner side 34 which is situated in an interior 40 of charging coil 22, and on an upper side 36 which is situated parallel to a main coil plane of charging coil 22. Magnetic field bundling element 26 rests on coil carrier 30 on inner side 34 and upper side 36. Coil core 24 is partially formed by a film 38. Film 38 forms a surface of coil core 24. Entire magnetic field bundling element 26 is surrounded by film 38. If magnetic field bundling element 26 breaks, resulting fragments are enclosed by film 38 and held in shape. Film 38 is glued to magnetic field bundling element 26. Film 38 is made of a soft elastic material. Film 38 is made of PVB. It has an elasticity modulus of 0.01 kN/mm$^2$.

In alternative designs, coil carrier 30 may be eliminated by coiling wound electrical conductor 28 directly into magnetic field bundling element 26. Designs are also conceivable in which an arrangement of the magnetic field bundling element is omitted on upper side 36, and coil core 24 is formed by two magnetic field bundling elements which are configured as cylindrical rings. Designs are also conceivable in which at least one magnetic field bundling element is situated only in interior 40 of charging coil 22.

Configurations may be provided in which film 38 is situated only on one or two of subareas 42, 44 of the surface of magnetic field bundling element 26 which are located parallel to the main coil plane and which are formed by the part of magnetic field bundling element 26 which forms upper side 36. In this case, film 38 is formed by one or two annular, disk-shaped film parts.

Charging coil 22 is situated directly on a housing wall 50 of hand tool battery 12. When hand tool battery 12 is in its charging position, as illustrated in FIG. 1, charging coil 22 is situated in an adjacent area of a similar charging coil 52 of charging device 14 (only indicated). Charging coil 52 of charging device 14 is situated on a housing wall 54 of charging device 14 so that charging coils 22, 52 are separated only by the two housing walls 50, 54 in a charging position. In this exemplary embodiment, housing wall 54 has a shell-shaped molding 56 which is provided for the purpose of surrounding housing wall 50 of hand tool battery 12 and ensuring a secure charging position. Latching mechanisms may also be provided which interconnect housing walls 50, 54. Alternatively, a housing wall of charging device 14 may have an at least largely flat design in the area of charging coil 52 of charging device 14. In this case, charging device 14 is provided so that hand tool battery 12 is positioned on the flat area, in particular unsecured, during a charging operation. Charging device 14 may have a marking which indicates a position of charging coil 52 to a user.

Magnetic field bundling elements 26 of charging coils 22, 52 form a largely closed magnetic field guiding system. A magnetic field 60 generated by one of charging coils 22, 52 thus surrounds wound electrical conductors 28 of both charging coils 22, 52, without magnetic field 60 being radiated into extensive parts of the open space. An effective energy transmission and/or compliance with EMC guidelines may be achieved.

A power tool, which is not illustrated in greater detail herein, has a comparable structure and includes a receptacle which is provided for accommodating hand tool battery 12. The battery may be fixed within the receptacle with the aid of a latching or rotating mechanism.

Figure 2:
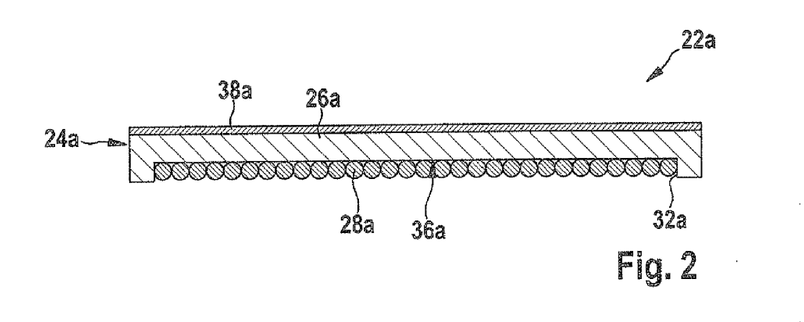
FIG. 2 shows an additional exemplary embodiment of the present invention.
Figure 3:
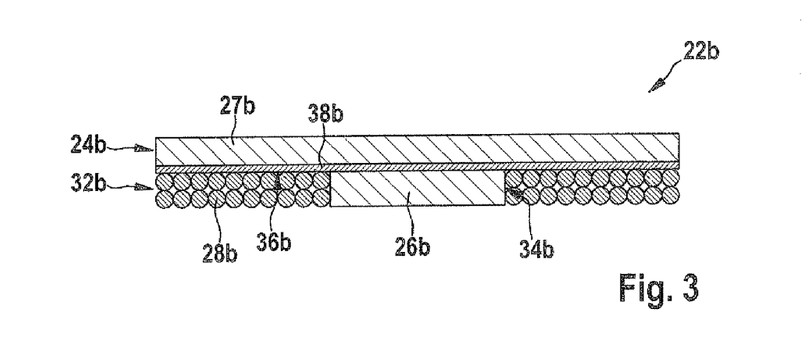
FIG. 3 shows another additional exemplary embodiment of the present invention.

FIGS. 2 and 3 show additional exemplary embodiments of the present invention. The following descriptions are largely limited to the differences between the exemplary embodiments, reference being made to the description of the other exemplary embodiments, in particular in FIGS. 1 and 2, with regard to identical components, features and functions. To distinguish between the exemplary embodiments, the letter a or b is added to the reference numerals of the exemplary embodiments in FIGS. 2 and 3. With regard to identically marked components, in particular with regard to components having identical reference numerals, reference may be made, in principle, to the drawings and/or the description of the other exemplary embodiments, in particular in FIGS. 1 and 2.

FIG. 2 shows a section of a further design of a charging coil 22a. Charging coil 22a has a coil core 24a. Coil core 24a is formed by a magnetic field bundling element 26a and a film 38a. Film 38a is glued onto an upper side of magnetic field bundling element 26a for the purpose of holding the element in shape in the event of a breakage. Charging coil 24a has a wound electrical conductor 28a which is configured as a disk. Magnetic field bundling element 26a is largely configured as a disk. Magnetic field bundling element 26a has an edge. Electrical conductor 28a is glued to magnetic field bundling element 26a by its upper side 36a. The edge of magnetic field bundling element 26a surrounds wound electrical conductor 28a on its outer side 32a. Coil core 24a has a rotationally symmetrical design. In other designs, the edge may be eliminated.

FIG. 3 shows a section of a further design of a charging coil 22b. A coil core 24b of charging coil 22b is formed by two magnetic field bundling elements 26b, 27b and a film 38b. Magnetic field bundling elements 26b, 27b are each configured as a circular disk, magnetic field bundling element 27b having a diameter which is three times the diameter of magnetic field bundling element 26b. Film 38b is situated between magnetic field bundling elements 26b, 27b. The film extends over an entire basic surface of magnetic field bundling element 27b. Film 38b glues magnetic field bundling elements 26b, 27b to form a rotationally symmetrical body. Charging coil 22b has a wound electrical conductor 28b, which is coiled around magnetic field bundling element 26b.

Figure 4:
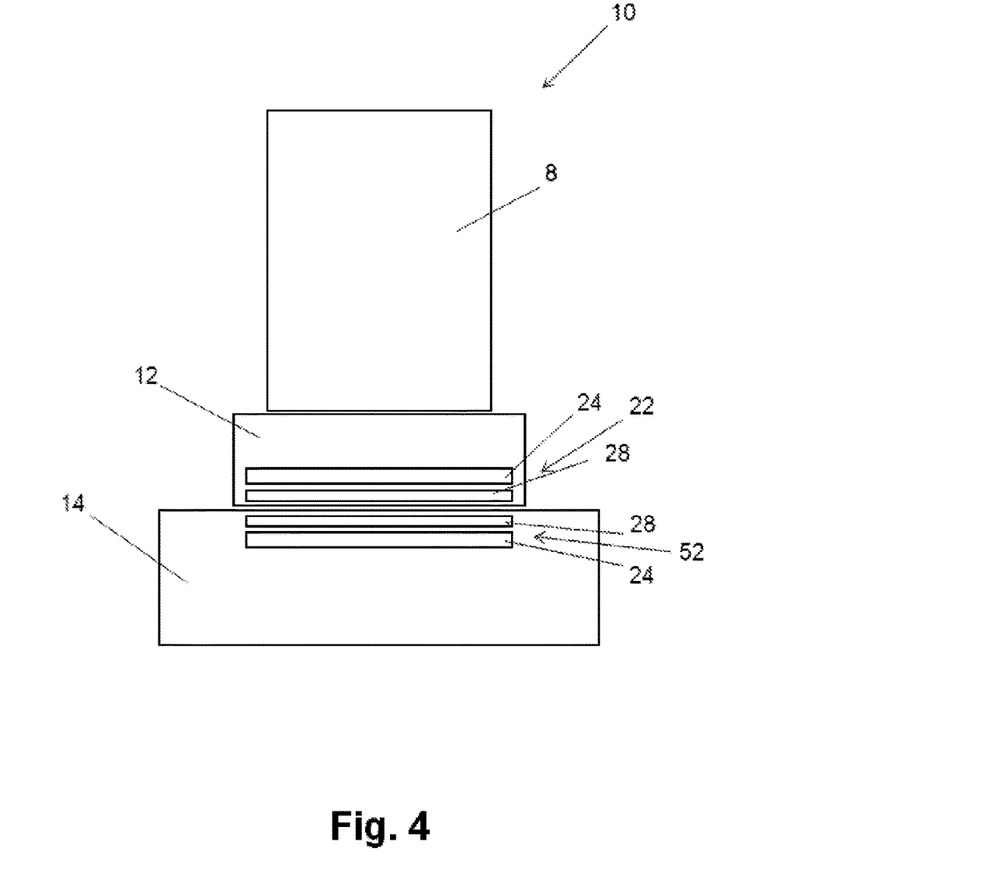
FIG. 4 shows a system of the present invention.

FIG. 4 shows a system 10 comprising a hand tool 8, hand tool battery 12, charging device 14, charging coil 22, charging coil 52, coil cores 24, and wound electrical conductor 28.

Figure 5:
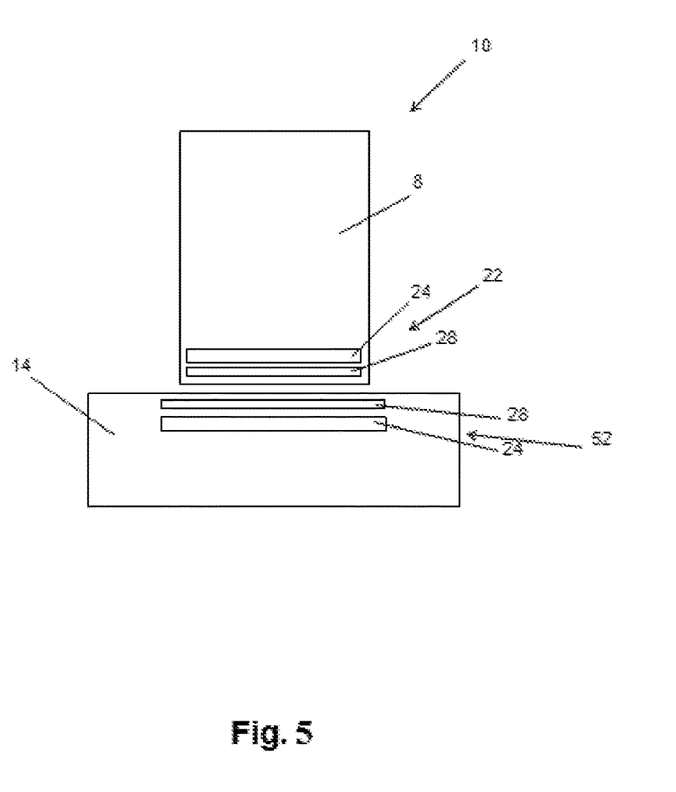
FIG. 5 shows a system of the present invention.

FIG. 5 shows a system 10 comprising a hand tool 8, charging device 14, charging coil 22, charging coil 52, coil cores 24, and wound electrical conductor 28.

What is claimed is:

1. A hand tool device, comprising:
at least one charging coil for inductive charging which includes at least one coil core which is at least partially made of a ceramic material and which is provided for transmitting energy, and at least one wound electrical conductor;
wherein the coil core is configured as a composite component, has at least two magnetic field bundling elements including an upper part bundling element and a lower part bundling element which are made of a ceramic material, and are at least partially formed by a film which glues the upper part bundling element and the lower part bundling element, wherein the upper part bundling element has a diameter that is three times a diameter of the lower part bundling element,
wherein the film is attached to an upper side of the at least one magnetic field bundling element, and the at least one wound electrical conductor is arranged on a lower side of the at least one magnetic field bundling element, wherein the upper side is facing away from the at least one magnetic field bundling element in a first direction and the lower side is facing away from the at least one magnetic field bundling element in a second direction, wherein the first direction is opposite to the second direction,
wherein the entire at least one magnetic field bundling element is surrounded by the film,
wherein the coil core has a toroid shape,
wherein the magnetic field bundling element has a toroid shape,
wherein the magnetic field bundling element surrounds the wound electrical conductor only on an upper side and an inner side,
wherein the coil core is at least partially made of a soft elastic material,
wherein the coil core is made of at least one sintered powder or pellets.

2. The hand tool device of claim 1, wherein the film forms at least one part of a surface of the coil core.

3. The hand tool device of claim 1, wherein the wound electrical conductor is configured as a disk.

4. The hand tool device of claim 1, wherein the wound electrical conductor is ring-shaped.

5. The hand tool device of claim 1, wherein the thickness of the film is a maximum of 1 mm.

6. The hand tool device of claim 1, wherein the wound electrical conductor is coiled onto a coil carrier.

7. The hand tool device of claim 6, wherein the coil carrier surrounds the wound electrical conductor on an upper side, a lower side and an inner side.

8. The hand tool device of claim 1, wherein the magnetic field bundling element is configured as a disk.

9. The hand tool device of claim 8, wherein the magnetic field bundling element is configured as an annular disk.

10. A hand tool battery, comprising:
at least one charging coil for inductive charging which includes at least one coil core which is at least partially made of a ceramic material and which is provided for transmitting energy, and at least one wound electrical conductor; wherein the coil core is configured as a composite component, has at least two magnetic field bundling elements including an upper part bundling element and a lower part bundling element which are made of a ceramic material, and are at least partially formed by a film which glues the upper part bundling element and the lower part bundling element, wherein the upper part bundling element has a diameter that is three times a diameter of the lower part bundling element,
wherein the film is attached to an upper side of the at least one magnetic field bundling element, and the at least one wound electrical conductor is arranged on a lower side of the at least one magnetic field bundling element, wherein the upper side is facing away from the at least one magnetic field bundling element in a first direction and the lower side is facing away from the at least one magnetic field bundling element in a second direction, wherein the first direction is opposite to the second direction,
wherein the thickness of the film is a maximum of 1 mm,
wherein the entire at least one magnetic field bundling element is surrounded by the film,
wherein the coil core has a toroid shape,
wherein the magnetic field bundling element has a toroid shape,
wherein the magnetic field bundling element surrounds the wound electrical conductor only on an upper side and an inner side,
wherein the coil core is at least partially made of a soft elastic material,
wherein the coil core is made of at least one sintered powder or pellets.

11. A charging device, comprising:
at least one charging coil for inductive charging which includes at least one coil core which is at least partially made of a ceramic material and which is provided for transmitting energy, and at least one wound electrical conductor; wherein the coil core is configured as a composite component, has at least two magnetic field bundling elements including an upper part bundling element and a lower part bundling element which are made of a ceramic material, and are at least partially formed by a film which glues the upper part bundling element and the lower part bundling element, wherein the upper part bundling element has a diameter that is three times a diameter of the lower part bundling element,
wherein the film is attached to an upper side of the at least one magnetic field bundling element, and the at least one wound electrical conductor is arranged on a lower side of the at least one magnetic field bundling element, wherein the upper side is facing away from the at least one magnetic field bundling element in a first direction and the lower side is facing away from the at least one magnetic field bundling element in a second direction, wherein the first direction is opposite to the second direction,
wherein the entire at least one magnetic field bundling element is surrounded by the film,
wherein the coil core has a toroid shape,
wherein the magnetic field bundling element has a toroid shape,
wherein the magnetic field bundling element surrounds the wound electrical conductor only on an upper side and an inner side
wherein the coil core is at least partially made of a soft elastic material,
wherein the coil core is made of at least one sintered powder or pellets.

12. A hand tool, comprising:
at least one charging coil for inductive charging which includes at least one coil core which is at least partially made of a ceramic material and which is provided for transmitting energy, and at least one wound electrical conductor;

wherein the coil core is configured as a composite component, has at least two magnetic field bundling elements including an upper part bundling element and a lower part bundling element which are made of a ceramic material, and are at least partially formed by a film which glues the upper part bundling element and the lower part bundling element, wherein the upper part bundling element has a diameter that is three times a diameter of the lower part bundling element, wherein the film is attached to an upper side of the at least one magnetic field bundling element, and the at least one wound electrical conductor is arranged on a lower side of the at least one magnetic field bundling element, wherein the upper side is facing away from the at least one magnetic field bundling element in a first direction and the lower side is facing away from the at least one magnetic field bundling element in a second direction, wherein the first direction is opposite to the second direction, wherein the entire at least one magnetic field bundling element is surrounded by the film, wherein the coil core has a toroid shape, wherein the magnetic field bundling element has a toroid shape, wherein the magnetic field bundling element surrounds the wound electrical conductor only on an upper side and an inner side, wherein the coil core is at least partially made of a soft elastic material, wherein the coil core is made of at least one sintered powder or pellets.

13. A system, comprising:

at least one of a hand tool battery, a charging device, and a hand tool;

wherein each of the hand tool battery, the charging device, and the hand tool includes:

at least one charging coil for inductive charging which includes at least one coil core which is at least partially made of a ceramic material and which is provided for transmitting energy, and at least one wound electrical conductor;

wherein the coil core is configured as a composite component, has at least two magnetic field bundling elements including an upper part bundling element and a lower part bundling element which are made of a ceramic material, and are at least partially formed by a film which glues the upper part bundling element and the lower part bundling element, wherein the upper part bundling element has a diameter that is three times a diameter of the lower part bundling element, wherein the film is attached to an upper side of the at least one magnetic field bundling element, and the at least one wound electrical conductor is arranged on a lower side of the at least one magnetic field bundling element, wherein the upper side is facing away from the at least one magnetic field bundling element in a first direction and the lower side is facing away from the at least one magnetic field bundling element in a second direction, wherein the first direction is opposite to the second direction, wherein the entire at least one magnetic field bundling element is surrounded by the film, wherein the coil core has a toroid shape, wherein the magnetic field bundling element has a toroid shape, wherein the magnetic field bundling element surrounds the wound electrical conductor only on an upper side and an inner side, wherein the coil core is at least partially made of a soft elastic material, wherein the coil core is made of at least one sintered powder or pellets.

* * * * *